(12) United States Patent
Moore

(10) Patent No.: US 8,479,891 B2
(45) Date of Patent: Jul. 9, 2013

(54) HYDRAULIC BRAKE CLAMP FOR BIKES

(75) Inventor: Wayne-Ian Moore, Changhua (TW)

(73) Assignee: Ashima Ltd., Changhua (TW)

( * ) Notice: Subject to any disclaimer, the term of this patent is extended or adjusted under 35 U.S.C. 154(b) by 167 days.

(21) Appl. No.: 13/223,325

(22) Filed: Sep. 1, 2011

(65) Prior Publication Data

US 2013/0056318 A1    Mar. 7, 2013

(51) Int. Cl.
 *F16D 55/228* (2006.01)
(52) U.S. Cl.
 USPC ............... 188/72.5; 188/73.31; 188/73.47
(58) Field of Classification Search
 USPC .............. 188/71.1, 72.5, 73.31, 73.32, 73.33, 188/73.47
 See application file for complete search history.

(56) References Cited

U.S. PATENT DOCUMENTS 2,866,526 A * 12/1958 Wiseman, Jr. ............... 188/71.8
4,716,993 A * 1/1988 Bass ........................... 188/73.32

FOREIGN PATENT DOCUMENTS

| JP | 56116538 A | * | 9/1981 |
| JP | 10009302 A | * | 1/1998 |
| JP | 10030660 A | * | 2/1998 |
| JP | 2001263394 A | * | 9/2001 |

* cited by examiner

*Primary Examiner* — Thomas J Williams

(57) ABSTRACT

A hydraulic brake clamp for bikes includes a clamp, two piston assemblies and a cap. The clamp has a brake disk room defined on the middle thereof so that a brake disk is received therein. An assembling room and a receiving room are respectively defined in two sides of the clamp. The brake disk room, the assembling room and the receiving room are in communication with each other. A connecting hole is defined through the clamp and communicates with the receiving room. The piston assemblies are assembled from the brake disk room to the assembling room and the receiving room. The cap is threaded into the receiving room via the connecting hole for sealing the receiving room and preventing the piston assemblies from dropping out from the connecting hole.

1 Claim, 3 Drawing Sheets

HYDRAULIC BRAKE CLAMP FOR BIKES

BACKGROUND OF THE INVENTION

1. Field of the Invention

The present invention relates to a hydraulic brake clamp, and more particularly to a compact and stable hydraulic brake clamp for bikes.

2. Description of Related Art

A conventional hydraulic brake clamp used for bicycle brake system known to application includes one clamp which is composed of two parts, two pistons installed into the two parts of the clamp respectively from outside of the parts. Under this arrangement, the structure of the clamp is unstable for a long term use because there are a lot of gaps between each members of the conventional hydraulic brake clamp. These gaps become larger and larger after the long term use so that the pistons cannot stably work in the clamp, even the pistons might drop out from the clamp. Moreover, the hydraulic oils might leak from these gaps of the clamp so that the piston would not work efficiently.

The present invention has arisen to mitigate and/or obviate the disadvantages of the conventional art.

SUMMARY OF THE INVENTION

The main objective of the present invention is to provide an improved hydraulic brake clamp for bikes.

To achieve the objective, a hydraulic brake clamp for bikes comprises: a clamp having a brake disk room defined on the middle thereof for receiving a brake disk therein, an assembling room and a receiving room respectively defined in the two sides of the clamp, the brake disk room, the assembling room and the receiving room being in communication with each other, a connecting hole defined through the clamp and communicated with the receiving room, two piston assemblies respectively installed in the assembling room and the receiving room via the brake disk room, a cap being threaded into the receiving room via the connecting hole for sealing the receiving room and preventing the piston assemblies from dropping out from the connecting hole, thereby the piston assemblies work out stably in the clamp for improving the safety of bicycles.

Each of the piston assemblies comprises a locking ring, a bolt, a pushing plate, a washer and a disk; the bolt, the pushing plate and the washer are located between the locking ring and the disk; the washer is located between the pushing plate and the disk; each of the pushing plate, the washer and the disk has a hole respectively for the bolt extending through; the pushing plate, the washer and the disk are connected to each other by the bolt and connected within the locking ring; the piston assemblies are in operation by the hydraulic oil to slow down bicycles.

Further benefits and advantages of the present invention will become apparent after a careful reading of the detailed description with appropriate reference to the accompanying drawings.

DETAILED DESCRIPTION OF THE INVENTION

Figure 1:
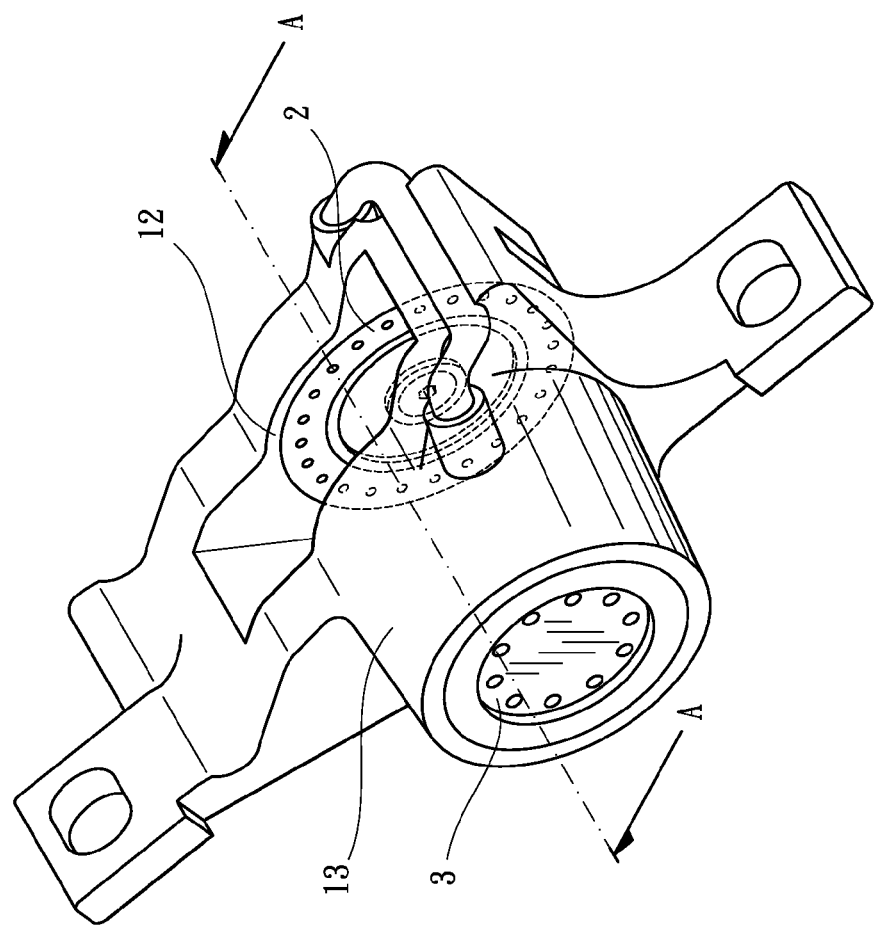
FIG. 1 is a perspective view of a hydraulic brake clamp for bikes in accordance with the present invention.
Figure 2:
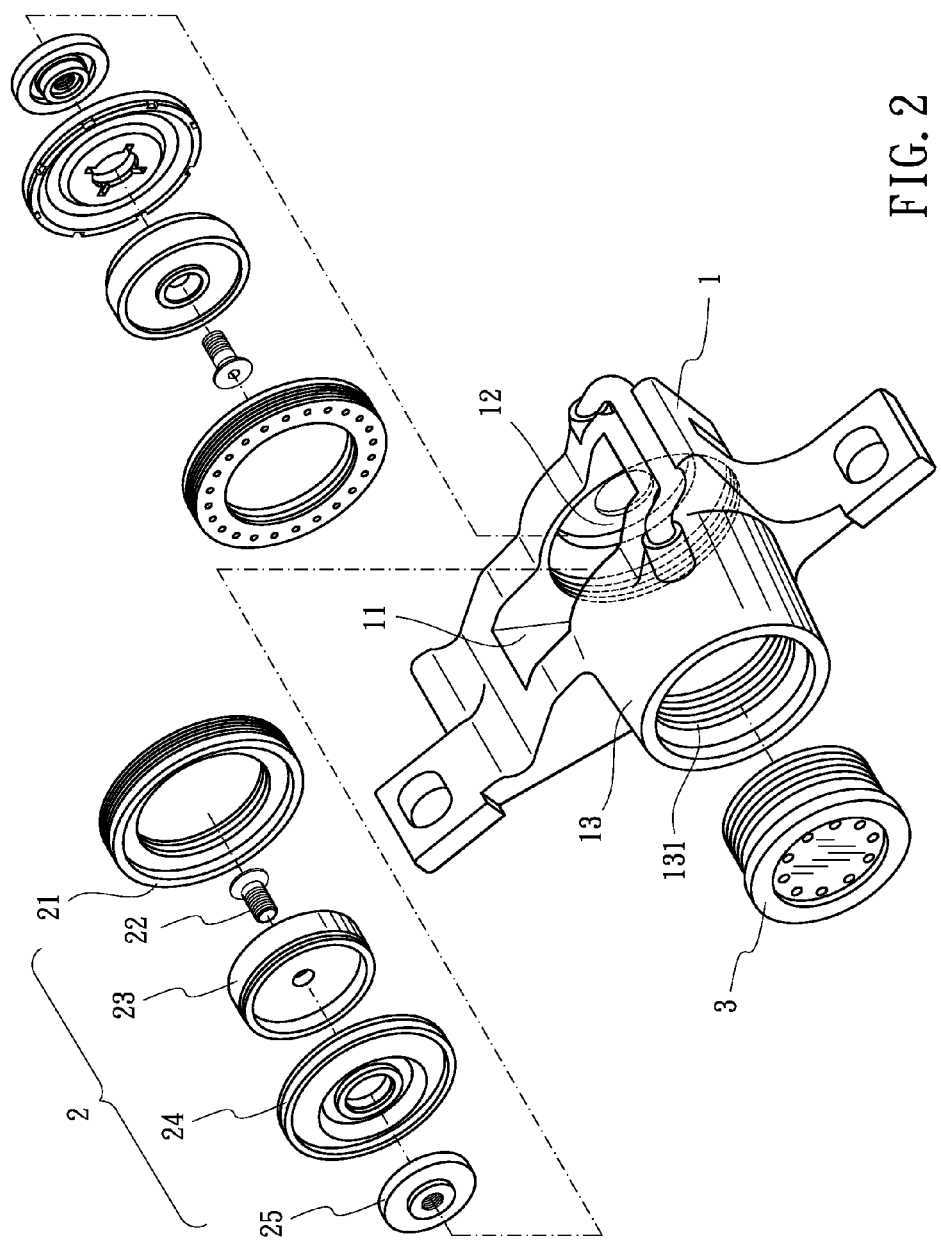
FIG. 2 is an exploded view of the hydraulic brake clamp for bikes in accordance with the present invention.
Figure 3:
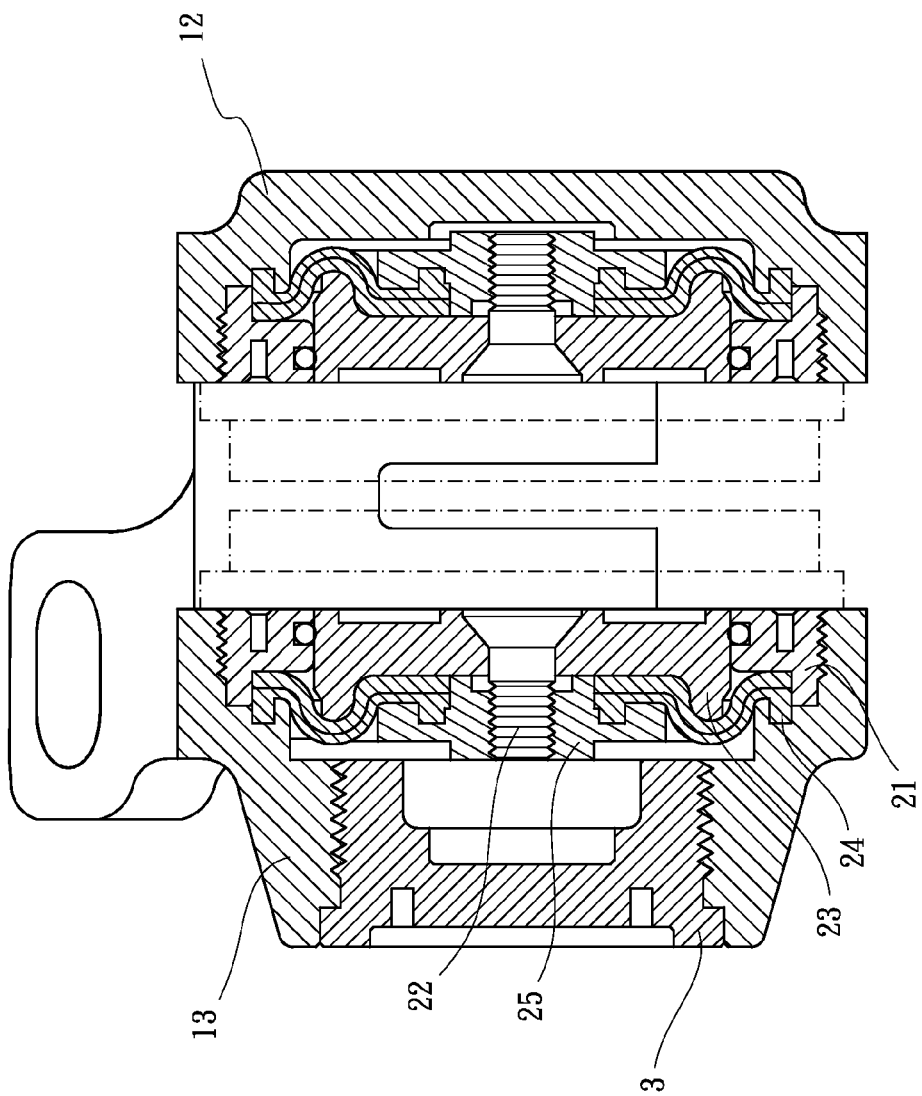
FIG. 3 is a cross-sectional view of the hydraulic brake clamp for bikes along a line AA shown in FIG. 1.

Referring to the drawings to FIGS. 1-3, a hydraulic brake clamp for bikes in accordance with the present utility model comprises a clamp 1, two piston assemblies 2 and a cap 3. The clamp 1 is an integrally formed part to improve the shortcomings of the conventional hydraulic brake clamp that is composed of two parts.

The clamp 1 has a brake disk room 11 defined on the middle thereof for receiving a brake disk therein. Therefore, the interaction between the clamp 1 and the brake disk causes bicycles to slow down. An assembling room 12 and a receiving room 13 are respectively defined in the two sides of the clamp 1. The brake disk room 11, the assembling room 12 and the receiving room 13 are in communication with each other. A connecting hole 131 is defined through the clamp 1 and communicates with the receiving room 13. Under this arrangement, the clamp 1 only has one opening hole said connecting hole 13 at one side and the clamp 1 is an integrally formed part so that the piston assemblies 2 are assembled from an inner side (said brake disk room 11) to each outer sides (said assembling room 12 and receiving room 13). To assemble the piston assemblies 2 in the present invention is more difficult than to assemble the piston assemblies in the conventional hydraulic brake clamp because the piston assemblies are directly put into the clamp from outer sides of the conventional hydraulic brake clamp. However, the gaps between the piston assemblies 2 and the receiving room 13, or the assembling room 12 are smaller than the conventional hydraulic brake clamp. Thus, the structure of the present invention is more stable than the conventional hydraulic brake clamp, and the leakage of hydraulic oils from the clamp 1 are less than the conventional hydraulic brake clamp.

The two piston assemblies 2 are respectively installed in the assembling room 12 and the receiving room 13 via the brake disk room 11. Each of the piston assemblies 2 comprises a locking ring 21, a bolt 22, a pushing plate 23, a washer 24 and a disk 25. The bolt 22, the pushing plate 23 and the washer 24 are located between the locking ring 21 and the disk 25. The washer 24 is located between the pushing plate 23 and the disk 25. Each of the pushing plate 23, the washer 24 and the disk 25 has a hole respectively for the bolt 22 extending through. The pushing plate 23, the washer 24 and the disk 25 are connected to each other by the bolt 22 and connected within the locking ring 21. The piston assemblies 2 are in operation by the hydraulic oil to slow down bicycles. The cap 3 is threaded into the receiving room 13 via the connecting hole 131 for sealing the receiving room 13 and preventing the piston assemblies 2 from dropping out from the connecting hole 131. Therefore, the piston assemblies 2 work out stably in the clamp 1 for improving the safety of bicycles.

Referring to FIGS. 2-3, one piston assembly 2 is accommodated into the assembling room 12. Another piston assembly 2 is accommodated into the receiving room 13 by the cap 3 sealing. The bolt 22 extends through the pushing plate 23, the washer 24 and the disk 25, and is engaged with the locking ring 21. The piston assemblies 2 are in operation by the hydraulic oil to slow down bicycles.

Although the invention has been explained in relation to its preferred embodiment, it is to be understood that many other possible modifications and variations can be made without departing from the spirit and scope of the invention as hereinafter claimed.

What is claimed is:

1. A hydraulic brake clamp for bikes comprising:

a clamp having a brake disk room defined on the middle thereof for receiving a brake disk therein, an assembling room and a receiving room respectively defined in the two sides of the clamp, the brake disk room, the assembling room and the receiving room being in communication with each other, a connecting hole defined through the clamp and communicated with the receiving room;

two piston assemblies respectively installed in the assembling room and the receiving room via the brake disk room; and a cap being threaded into the receiving room via the connecting hole for sealing the receiving room and preventing the piston assemblies from dropping out from the connecting hole, thereby the piston assemblies work out stably in the clamp for improving the safety of bicycles;

wherein each of the piston assemblies comprises a locking ring, a bolt, a pushing plate, a washer and a disk; the bolt, the pushing plate and the washer are located between the locking ring and the disk; the washer is located between the pushing plate and the disk; each of the pushing plate, the washer and the disk has a hole respectively for the bolt extending through; the pushing plate, the washer and the disk are connected to each other by the bolt and connected within the locking ring; the piston assemblies are in operation by the hydraulic oil to slow down bicycles.

* * * * *